J. G. PERRY.
Sausage Machine.

No. 36,232.

Patented Aug. 19, 1862.

Witnesses:
Wilkins Updike
Oliver H. Perry

Inventor:
John G. Perry

UNITED STATES PATENT OFFICE.

JOHN G. PERRY, OF SOUTH KINGSTON, RHODE ISLAND.

IMPROVED SAUSAGE-FILLER.

Specification forming part of Letters Patent No. 36,232, dated August 19, 1862.

*To all whom it may concern:*

Be it known that I, JOHN G. PERRY, of South Kingston, in the county of Washington, in the State of Rhode Island, have invented a new and Improved Machine for Filling Sausages; and I do hereby declare that the following is a full and correct description thereof, reference being had to the accompanying drawings, and to the letters of reference marked thereon.

The same letters denote similar parts in all the figures.

Figure 1:
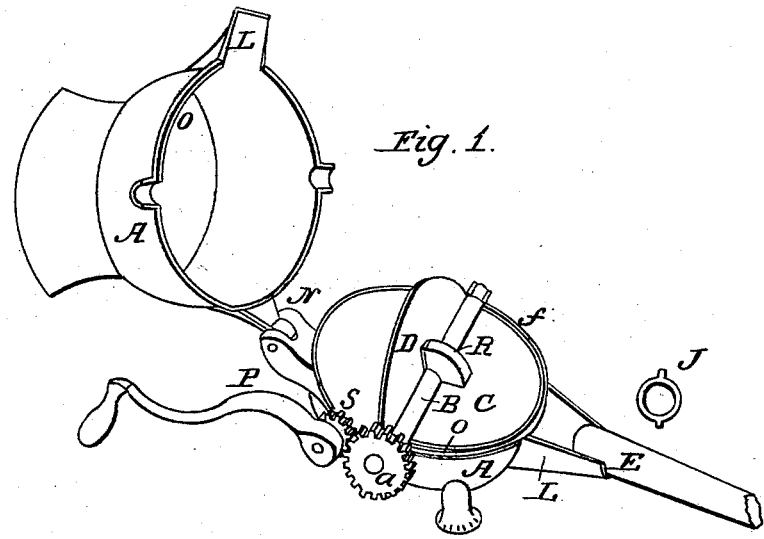
Figure 2:
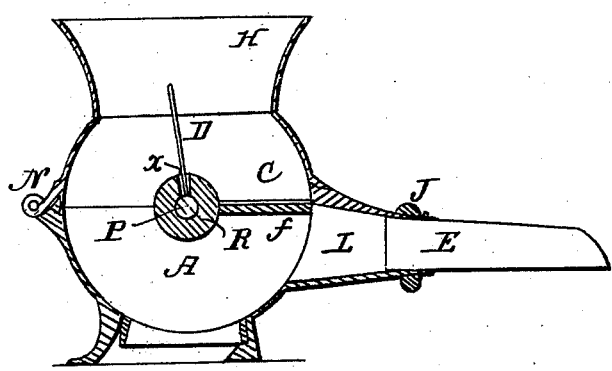
Figure 3:
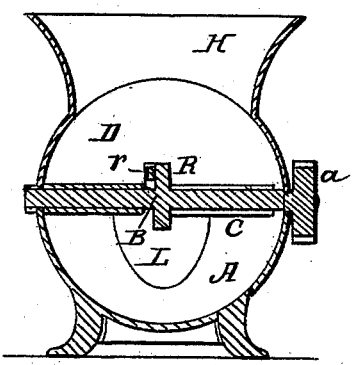

Figure 1 is a perspective view of the machine, open to show the inside. Fig. 2 is a vertical section taken through the center in a direction square to the axis of the shaft. Fig. 3 is a vertical cross-section through the center of the shaft.

To construct my improved sausage-filler, make a case, A, the shape of which is not necessarily spherical, as shown in the drawings, but should be circular in the direction square to the axis of the shaft B, which is placed in the center of the case and turns in bearings in the sides. This case I divide horizontally through its center into an upper and lower part, which are hinged together at N, and on the opposite side a spout, L, is made to hold the nozzle E, on which the cases are put to be filled with meat.

On the shaft B are put two loose leaves, D C, just wide enough to fill the case on one side of the shaft. These leaves extend around the shaft, one on each side of the collar R, which is made fast to the shaft for the purpose of driving them when in certain positions, and the two leaves have notches in them for the collar R to turn in when from their position the leaves are not to move around. There is a notch, x, made in the collar R, Fig. 2, into which the leaves slide when they are required to move, and on one side of the collar R near the notch is placed a beveled projection, r, (see Fig. 3,) which moves the leaf into position in the notch, as will be explained hereinafter. A beveled projection, f, Fig. 2, is also made on the inside edge of the case at f, Fig. 1, for the purpose of pushing the leaves out of the notch x in the collar R and into a groove, o, made in the opposite side of the case when they are to be held stationary. Three leaves or more may be used by making another notch, with its projection like those already described, in the collar for every additional leaf. A crank may be put on the end of the shaft B to turn it by; or, as in the drawings, it may be put on a stud attached to the case at one side of the shaft, and a small gear-wheel, s, fastened to the crank to gear into a larger one, a, on the shaft B, for the purpose of driving the leaves slower and with more force.

The operation of the machine is as follows: The leaves being in their proper place—that is, one of them, D, in the notch in the collar R and the other with its edge in the groove o in the side of the case—the top part is closed down upon the other and secured by passing the ring J (see Fig. 2) over the two parts of the spout L. The chopped meat is then put into the top of the case, which is formed into a hopper, H, to receive it, and the crank P being turned, the leaf that is in the notch x in the collar is carried around, taking the meat with it until the further progress of the latter is stopped by the stationary leaf in the groove o, when it is forced out of the spout L by the continued pressure of the moving leaf D until that leaf comes nearly in contact with the stationary one, C. At this time the beveled projection r on the collar begins to act upon the stationary leaf, sliding it sidewise out of the groove o in the case, that holds it from turning, into the notch in the collar R, while the other leaf, coming in contact with the projection f on the edge of the case, is forced out of the notch in the collar R and into the groove o, just vacated by the other leaf. The motion of the crank being continued, this last-mentioned leaf is brought around, and the same operation takes place between the leaves again. When more leaves are used, one of them remains stationary, as described, while the others move around, each one taking its turn to occupy the groove o and prevent the meat from passing around by the spout, while it is forced out by the others as they approach it.

Having thus described my sausage-filler, I claim—

The combination of the leaves (two or more) with the case, substantially as herein described, and for the purpose set forth.

JOHN G. PERRY.

Witnesses:
 WILKINS UPDIKE,
 OLIVER H. PERRY.